United States Patent Office 3,576,020
Patented Apr. 20, 1971

3,576,020
FLUOROAROMATIC SILICONE COMPOUNDS
Lorne A. Loree and Eric D. Brown, Midland, Mich., assignors to Dow Corning Corporation, Midland, Mich.
No Drawing. Filed Feb. 20, 1969, Ser. No. 801,202
Int. Cl. C07f 7/08, 7/18
U.S. Cl. 260—448.20
11 Claims

ABSTRACT OF THE DISCLOSURE

Compounds of the general formula

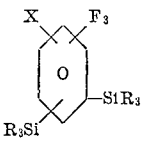

for example

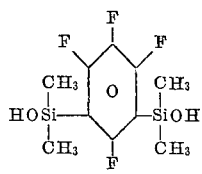

are hydrolyzed and condensed to produce polymers from which elastomers can be formulated.

---

This invention relates to new bis-silylfluoroaromatic compounds. In one aspect the invention relates to novel fluorinated silylphenylene polymers. In another aspect the invention relates to a method of producing di-Grignard fluoroaromatic compounds.

The preparation of bis-silylarylene compounds by a Grignard type method is known. Usually this difunctional Grignard reagent is synthesized fro ma dibromoarylene or diiodoarylene and this intermediate is reacted with a silane to form the bis-silylarylene compound. In some instances, a dichloroarylene can be used to form the Grignard reagent if the reaction is carried out in the presence of tetrahydrofuran. Although mono-substituted perfluoroaromatic silanes are known (see U.S. Pat. 3,269,928), to date, difunctional Grignard reagents of fluorinated arylenes have not been made.

By the practice of the invention, difunctional Grignard reagents of fluoroaromatic compounds are synthesized and bis-silylfluoroaromatic compounds are produced.

Accordingly, it is an object of the invention to provide bis-silylfluoroaromatic compounds.

Another object of the invention is to provide stable silylfluoroaromatic polymers.

An additional object of the invention is to provide a method of producing bis-silylfluoroaromatic compounds in economical yield.

These and other objects of the invention will be apparent to one skilled in the art upon consideration of the following specification and appended claims.

According to the invention there is provided a compound of the Formula I

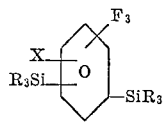

in which

X is a hydrogen atom, a halogen atom or a perfluoralkyl radical of from 1 to 10 carbon atoms; and R is selected from the group consisting of halogen atoms, lower alkyl radicals, lower alkoxy radicals, a —CH$_2$CH$_2$R$_f$ radical where R$_f$ is a perfluoroalkyl of from 1 to 10 carbon atoms, the hydroxyl group, the hydrogen atom.

This bis-silylaromatic compound includes the various isomers. The following are illustrative.

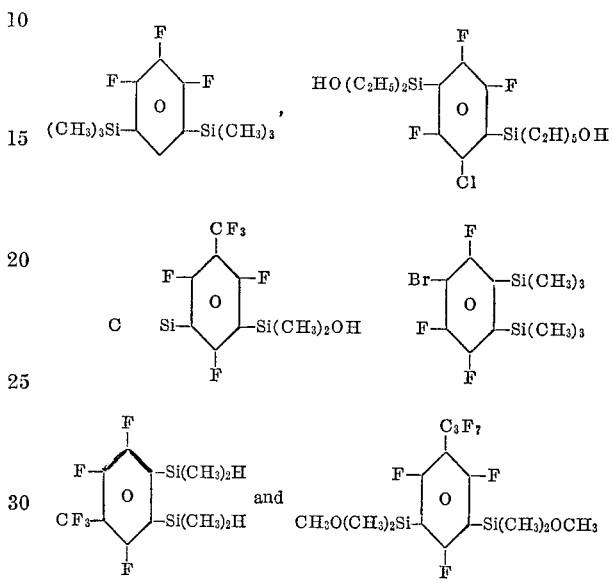

As described above, the trifluorophenyl moiety can be substituted with a hydrogen atom, a halogen atom, i.e., fluorine, bromine, chlorine or iodine; or a perfluoroalkyl radical, including radicals of the formula —CF$_3$, C$_2$F$_5$, C$_3$F$_7$ and so on through C$_9$F$_{19}$ and C$_{10}$F$_{21}$. The radicals can be of straight or branched-chain structure.

The R substituents of the silicon atoms can be halogen atoms (Cl, Br, I, and F); lower alkyl radicals containing from 1 to 6 carbon atoms, for example, methyl, propyl, butyl and hexyl radicals; or alkoxy radicals containing from 1 to 6 carbon atoms, for example methoxy, ethoxy, propinoxy and the like. In addition, the hydroxyl group (—OH) and hydrogen atom can be bonded to the silicon atom. The same or different R substituents may be bonded to the same silicon atom.

When the method of production of the above compounds involves the in-situ formation of a di-Grignard reagent, the two silicon atoms will of necessity contain the same substituents, but different coupling reagents can be formed and the coupling can be accomplished in a separate reaction to provide bis-silyl compounds in which the R substituents on each silicon atom are different.

Thus in accordance with the invention, there is provided a method of preparing bis-silyl compounds of the general formula

in which

X and R are as previously described, comprising the steps of: forming a mixture of a silane of the general formula ClSiR₃, where R is as previously defined, and a halofluoroaromatic of the formula

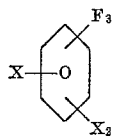

in which

X is as previously defined and

Y is a chlorine, bromine or iodine atom, and magnesium in tetrahydrofuran; heating the mixture to effect the reaction between the silane, the halofluoroaromatic and magnesium to produce the bis-silyl compound; and recovering the bis-silyl compound from the reaction mixture.

It is preferred to effect the reaction by admixing the silane, the halofluoroaromatic compound and tetrahydrofuran and then adding this mixture to a reaction vessel containing magnesium metal in the form of turnings. The temperature at which coupling between the silane and the halofluoroaromatic occurs is not critical and may vary. Generally temperatures between 50° and 200° C. may be employed. The preferred temperature is the refluxing temperature of the reacted mixture. When the reactants in the tetrahydrofuran are added to the magnesium at a sufficiently slow rate, the heat of reaction is great enough to maintain reflux conditions.

Since two moles of silane combine with one mole of the halofluoroaromatic reactant, two moles of silane and two moles of magnesium per mole of halofluoroaromatic should be employed in the reaction.

The monomers (I) are polymerized in the presence of certain catalysts to form a polymer consisting essentially of units of the formula

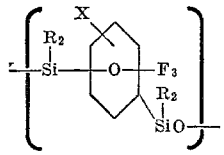

in which X and R are as previously defined.

The polymer chain is generally endblocked with hydroxyl groups but other units, such as the trimethylsiloxy group, can be used. The above polymer formula includes all of the possible isomers:

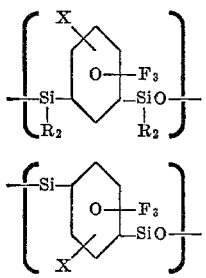

and

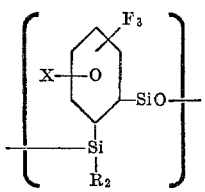

Of course, the polymer can contain different isomeric units if the monomeric precursor (I) is a mixture of isomers.

The polymer (II) is prepared by condensation of the diol monomer in the presence of t-butylhydroxyamine-trifluoroacetate or tetramethylguanidine-trifluoroacetate as a catalyst. The method of preparation is illustrated in the examples.

The polymer can be made as a fluid or gum. The fluid polymer is heat-stable and useful as a heat transfer medium. Both the fluid and gum have been compounded with fillers to form heat-stable elastomers, which have utility as sealants and gasket material in high temperature environments. The polymers show resistance to crosslinking by usual methods, including peroxide cures and radiation. This resistance to radiation, permits the polymer to be used as a sealant in high radiation environments because the material retains its flexibility.

The monomers (I) can also be cohydrolyzed with other organosiloxanes to provide copolymers in which at least one unit is of the formula

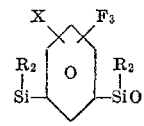

in which X and R are as previously defined; the remaining units being of the general formula $$Z_a SiO_{\frac{4-a}{2}}$$

in which Z is the hydrogen atom, the hydroxy group, a hydrolyzable radical or an organic radical attached to the Si atom through an Si—C bond, and $a$ has a value of from 0 to 3 inclusive.

The term "hydrolyzable radical" as used in this specification is defined as a group which is removed from the silicon atom by reaction with water at room temperature. Exemplary of hydrolyzable groups are halogen atoms; such as fluorine, chlorine, and bromine; hydrocarbonoxy groups such as methoxy, ethoxy, octadecyloxy, allyloxy, cyclohexyloxy, phenoxy, tolyloxy, benzyloxy,

—OCH₂CH₂OCH₃ and

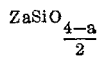

acyloxy groups such as acetoxy, propionyloxy, benzoyloxy, cyclohexyloxy, and

ketoxime groups such as —ON=C(CH₃)₂ and

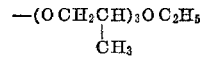

amine groups such as —NH₂ —N(CH₃)₂ and

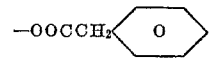

sulfide groups such as —SCH₃ and

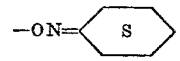

the nitrile group, the isocyanate group, sulfate groups such as

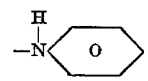

carbamate groups such as —OOCNHCH₃,

—OOCN(CH₃)₂ and —OOCN(C₂H₅)₂ and groups such as —ON(CH₃)₂ and —ON(C₃H₇)₂.

Z can be any monovalent hydrocarbon radical such as alkyl radicals, for example, methyl, ethyl, isopropyl, t-butyl, octadecyl, myricyl; cycloaliphatic radicals, for example, cyclohexyl, cyclopentyl and cyclohexenyl; aromatic hydrocarbon radicals, for example, phenyl, xenyl and naphthyl; aralkyl hydrocarbon radicals such as benzyl, beta-phenylethyl and beta-phenylpropyl; and alkenyl radical, for example, vinyl, allyl, hexenyl, butadienyl or other unsaturated groups including $CH \equiv C—$. The same or different Z groups can be attached to the same silicon atom.

Z can also be any beta-perfluoroalkylethyl radical of the formula $R'CH_2CH_2—$ in which $R'$ is perfluoroalkyl radical such as $CF_3$, $C_2F_5$, $C_8F_{17}$, $C_{10}F_{21}$, $(CF_3)_2CF—$ or

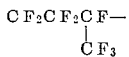

In addition Z can be any halohydrocarbon radical in which the halogen is Cl, Br or I, such as chloromethyl, gamma-chloropropyl, bromo-octadecyl, chlorocyclohexenyl, 3-chlorobutenyl-4, chlorophenyl, bromoxenyl, tetrachlorophenyl, p-chlorobenzyl, trichloropropyl and iodophenyl.

The monomer dioles of the invention are cohydrolyzed with silanes of the formula

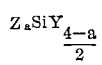

in which

Z is as previously defined; and
Y is a hydrolyzable group to obtain the above-described copolymers. The particular method chosen for the cohydrolysis can vary widely depending upon the nature of the substituent groups on the silicon atom. Thus, there are no critical conditions other than the well known methods for hydrolyzing and cohydrolyzing silanes.

The copolymers include

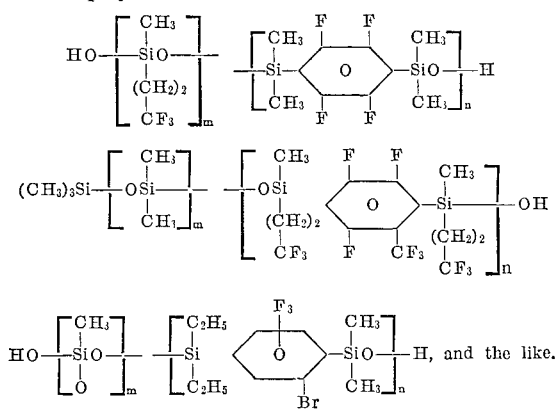

The copolymers are fluids, gums and resins, depending upon the nature of the substituents on the silicon atoms and the degree of polymerization. They are useful as lubricants, coating compositions and sealants. For example a copolymer having 90 mole percent of phenylmethylsiloxane units and 10 mole meta-dimethylsilyltetrafluorophenylene-dimethylsiloxane units can be used as the base fluid in formulating grease.

The following examples are illustrative of the invention which is set forth in the claims.

EXAMPLE 1

Twenty-three grams of magnesium turnings were added to a two-liter, three-necked flask, which was fitted with a reflux condenser, a stirrer, and an addition funnel. The magnesium was dried and a nitrogen purge was maintained throughout the reaction. A mixture of 102 grams (0.466 mole) of dichlorotetrafluorobenzene and 125 grams (1.15 moles) of trimethylchlorosilane in 500 milliliters of tetrahydrofuran was introduced into the flask by means of the addition funnel. Dropwise addition of the reactants maintained reflux temperature during the reaction.

Upon completion of the addition, the reaction mixture was poured into ice water and the organic layer was extracted with ether, dried and fractionated by distillation.

The product, 1,3-bis(trimethylsilyl) tetrafluorobenzene was recovered in 86.5 percent (118.5 grams) yield. The product was identified by elemental analysis, as well as by $H^1$ and $F^{19}$ NMR. The product had a boiling point of 124° C./30 mm. Hg and a melting point of 62–62.5° C.

EXAMPLE 2

Magnesium (24.3 grams) and tetrahydrofuran were added to the reaction flask described in Example 1. Trimethylchlorosilane (108.5 grams, 1 mole) and 3,5-dichloro-2,4,6-trifluorobenzotrifluoride were mixed and added dropwise to the flask. A gentle reflux was maintained during the reaction by the dropwise addition.

When the reaction was complete, the magnesium salts were removed by filtration and the filtrate was poured into ice water and extracted with ether. After drying, the extracted organic portion was distilled to obtain 152.3 grams (88.4% yield) of 3,5-bis(trimethylsilyl)2,4,6-trifluorobenzotrifluoride, which had a boiling point of 113.5° C./22 mm. Hg and a melting point of 51–51.5° C.

*Analysis.*—Calculated for $C_{13}F_6H_{18}Si_2$ (percent): C, 45.4; F, 33.2; H, 5.26; Si, 16.27. Found (percent): C, 45.6; F, 33.3; H, 5.26; Si, 15.9.

EXAMPLE 3

Magnesium turnings (36.4 grams) were placed in a reaction flask, heated to drive off moisture and then covered with 750 milliliters of tetrahydrofuran. A mixture of 117.5 grams (0.5 mole) of sym-trichlorotrifluorobenzene and 162.6 grams (1.5 moles) of trimethylchlorosilane was added to the flask. After initial heating, reflux conditions were maintained by the addition rate. Upon completion of the addition, heating was again initiated and the reaction mixture was refluxed for three hours.

After refluxing, the reaction mixture was added to two liters of water which contained 150 milliliters of concentrated HCl. Ether extraction of the organic layer and distillation gave 1-chloro-3-hydro-5-trimethylsilyltrifluorobenzene and 1,3-dichloro-5-trimethylsilyltrifluorobenzene as overhead product.

The distillation residue, a solid, was recrystallized from methanol to obtain the bis-silyl product, 1-chloro-3,5-bis-(trimethylsilyl)trifluorobenzene in seven percent yield (10.9 grams). This product had a boiling point of 143° C./17 mm. Hg and a melting point of 70–71° C.

EXAMPLE 4

Thirty grams of magnesium turnings were dried and covered with 500 millilitiers of tetrahydrofuran in a two-liter flask. A mixture of o-dibromotetrafluorobenzene and 86.3 grams (0.914 mole) of dimethylchlorosilane was added to the flask. After initial heating, refluxing conditions were maintained by the addition rate.

When the reaction was complete, the reaction products were distilled from the magnesium salts under reduced pressure. Fraction of the product gave 47.5 grams (39.1% yield) of 1,2-bis-(dimethylsilyl) tetrafluorobenzene, which had a boiling point of 110° C./29 mm. Hg and a refractive index, $n_D^{25}$, of 1.4674.

*Analysis.*—Calculated for $C_{10}F_4H_{14}Si_2$ (percent): C, 45.11; F, 28.57; H, 4.51; Si, 21.05; SiH, 0.75. Found (percent): C, 45.6; F, 28.0; H, 5.48; Si, 21.2; SiH, 0.76.

EXAMPLE 5

Thirty grams of magnesium turnings were added to a two-liter flask and covered with tetrahydrofuran. A mixture of 72 grams (0.25 mole) of 1,2-dibromotetrafluorobenzene and 108.5 grams (1.0 mole) of trimethylchlorosilane was added at a rate sufficient to maintain reflux after initial heating. When the addition was complete the reaction mixture was added to water and extracted with ether. Distillation gave inseparable mixtures which were analyzed by $H^1F^{19}$ NMR and mass spectrometry.

The lower boiling fraction was a mixture of hydrotrimethylsilyl-tetrafluorobenzene and dihydrotrimethylsilyltrifluorobenzene. The higher boiling fraction was trimethylsilylpentafluorobenzene and 1-hydro-2,6-trimethylsilyl-trifluorobenzene in about a 50—50 mixture.

Analysis of the 50:50 mixture.—Calculated for (percent): C, 50.5; F, 23.21; H, 6.50; Si, 19.7. Found (percent): C, 49.3; F, 20.2; H, 6.40; Si, 19.9.

The structures were determined by both $F^{19}$ NMR and mass spectra independently.

EXAMPLE 6

Dry magnesium turnings (97.2 grams) were placed in a two-liter flask. A mixture of 438 grams (2.0 moles) of 1,3-dichlorotetrafluorobenzene and 338 grams (4.0 moles) of dimethylchlorosilane was formed. Tetrahydrofuran was added to the mixture and the reaction was initiated by dropwise addition of the mixture. Upon completion of the reaction, the solvent and products were removed from the magnesium salts by distillation at reduced pressure. This material was redistilled to obtain 168.9 grams (31.6% yield) of 1,3-bis(dimethylsilyl) tetrafluorobenzene having a boiling point of 105° C./20 mm. Hg.

Analysis.—Calculated for $C_{10}F_4H_{14}Si_2$: C, 45.11; F, 28.57; H, 5.26; Si, 21.05; SiH, 0.75. Found: C, 45.6; F, 28.0; H, 5.46; Si, 21.2; SiH, 0.76.

EXAMPLE 7

Sixty-four grams of methanol were mixed with 153.6 grams of the product of Example 6. One gram of 1% platinum on charcoal was added and the mixture was heated for 20 hours at reflux temperature. Distillation of the reaction mixture gave 171.3 grams (91% yield) of 1,3 - bis(dimethylmethoxysilyl)tetrafluorobenzene, which had a boiling point of 150° C./30 mm. Hg and a refractive index $n_D^{25}$, of 1.4674.

Analysis.—Calculated for $C_{12}F_4H_{18}O_2Si_2$ (percent): C, 44.17; F, 23.31; H, 5.52; Si, 17.81; SiOCH$_3$, 18.09. Found (percent): C, 44.5; F, 22.9; H, 6.03; Si, 18.6; SiOCH$_3$, 17.8.

EXAMPLE 8

One-hundred and sixty-five grams of the product of Example 7 were dissolved in ether and added to a Morton flask which contained one-liter of water and 3 milliliters of acetic acid. The reactants were stirred vigorously for 20 hours. The ether layer was separated and the ether evaporated. The resulting white solid was recrystallized from methanol to obtain 149 grams (50% yield) of 1,3-bis(dimethylhydroxysilyl) tetrafluorobenzene which had a melting point of 136° C.

Analysis.—Calculated for $C_{10}F_4H_{14}O_2Si_2$ (percent): C, 40.26; F, 25.5; H, 4.70; Si, 18.79; SiOH, 11.40. Found (percent): C, 40.0; F, 19.8; H, 4.89; Si, 18.48; SiOH, 11.90.

EXAMPLE 9

Fifty grams of the product of Example 8 were placed in a 200 milliliter flask with two drops of tetramethylguanidine·2CF$_3$COOH as catalyst. The flask was placed on a rotary evaporator, evacuated and heated for 20 hours at 100° C. The resulting polymer

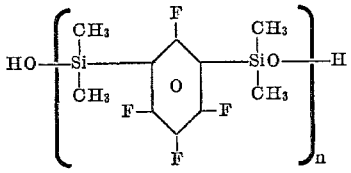

was a tough crystalline gum which had a melting point of about 80° C., flowed slightly under pressure at 115° C. and was fluid at 300° C. The structure was confirmed by $H^1$ and $F^{19}$ NMR and infrared spectroscopy.

EXAMPLE 10

36 grams of the product of Example 8 were placed in a 200 milliliter flask. Two drops of t-butylhydroxy-aminetrifluoroacetate were added and the mixture was heated to 100° C. for 20 hours. The resulting polymer was the same crystalline gum as obtained in Example 9.

EXAMPLE 11

10.0 grams of the product of Example 8 were dissolved in toluene. Four drops of tetramethylguanidine·2CF$_3$COOH were added and the mixture was heated to reflux for 20 hours. Water produced by the condensation polymerization was azeotroped with the solvent and continuously removed to facilitate the reaction. The resulting polymer was a fluid having a viscosity of 2000 cs. at 25° C.

EXAMPLE 12

Dry magnesium turnings (30.8 grams) were placed in a two-liter flask and covered with tetrahydrofuran. A mixture of 108 grams (0.5 mole) of dichlorotetrafluorobenzene and 200 grams (1 mole) of 3,3,3-trifluoropropylmethylchlorosilane was added dropwise. The flask was cooled to maintain the reaction temperature at from 10 to 15° C. Upon completion, the magnesium salts were precipitated by the addition of hexane and removed by filtration. Distillation gave 241 grams (58% yield) of 1,3-bis-(trifluoropropylmethylsilyl)tetrafluorobenzene which had a boiling point of 155° C./14 mm. Hg and a refractive index, $n_D^{25}$ of 1.4270.

Analysis.—Calculated for $C_{14}F_{10}H_{16}Si_2$: C, 39.07; F, 44.19; H, 3.72; Si, 13.02; SiH, 0.48. Found: C, 39.6; F, 43.7; H, 3.89; Si, 12.7; SiH, 0.48.

The above product was methoxylated by the procedure described in Example 7 to obtain 112 grams of 1,3-bis-(trifluoropropylmethylmethoxysilyl) - tetrafluorobenzene which had a boiling point of 153° C./4 mm. Hg.

Analysis.—Calculated for $C_{16}F_{10}H_{20}O_2Si_2$ (percent): C, 39.18; F, 38.78; H, 4.08; Si, 11.42; SiOCH$_3$, 11.43. Found (percent): C, 39.3; F, 39.5; H, 4.17; Si, 12.4; SiOCH$_3$, 11.4.

The methoxylated product was hydroxylated by the procedure set forth in Example 8 to yield 98.7 grams of 1,3 - bis(trifluoropropylmethylhydroxysilyl)tetrafluorobenzene which had a melting point of 68° C.

This material was polymerized by addition of 0.2 gram of tetramethylguanidine-γCF$_3$COOH to 20 grams of the diol in a flask. The flask was placed on a rotary evaporator and heated for 20 hours at 100° C. The resulting polymer,

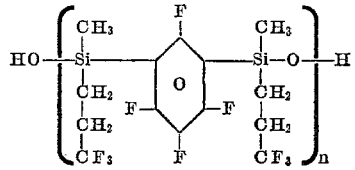

was a dry amorphous gum having a density of 1.475 and a number average molecular weight of 2830 as determined by vapor phase osmometry.

EXAMPLE 13

Dry magnesium chips (26.4 grams) were placed in a two-liter flask and covered with 750 milliliters of tetrahydrofuran. A mixture of 109.5 grams (0.5 mole) of dichlorotetrafluorobenzene and 288.5 grams (1 mole) of bis-trifluoropropylmethoxychlorosilane was added dropwise to maintain reflux conditions. Upon completion of the reaction, the inorganic salts were removed by addition of hexane and filtration. This was followed by a vacuum strip distillation to remove the bis-silyl product from the remaining magnesium salts. Further distillation gave 45.8 grams of 1,3-bis(ditrifluoropropylmethoxysilyl) tetrafluorobenzene. The structure of this compound was determined by $H^1$ and $F^{19}$ NMR and infrared spectra.

The 1,3-bis(di-trifluoropropylmethoxysilyl) tetrafluorobenzene was hydrolyzed by the procedure set forth in Example 8 to give 1,3-bis(di-trifluoropropylhydroxysilyl) tetrafluorobenzene.

A 20 gram portion of the hydrolyzate was added to a distillation flask along with two drops of tetramethylguanidinetrifluoroacetate. The mixture was heated to 100° C. for 20 hours to obtain the following polymer:

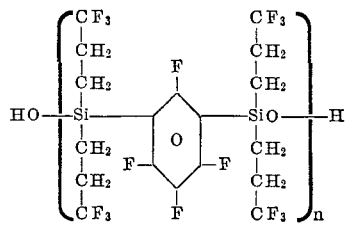

The symmetrically substituted product was crystalline. The crystalline material can be utilized to form film and fibers.

EXAMPLE 14

When equimolar portions of the hydrolyzate of Example 13 and a hydroxyl-endblocked dimethylpolysiloxane (dp=7–10) are cocondensed in a solution containing tetraguanidine-trifluoroacetate as a catalyst, a copolymer of the following units is obtained:

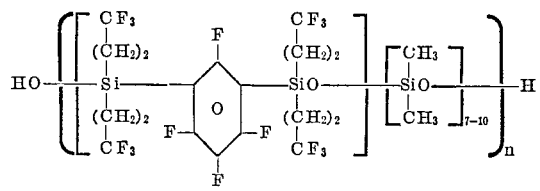

Reasonable modification and variation are within the scope of the invention which sets forth novel fluoroaromatic silicon compounds.

That which is claimed is:

1. A compound of the general formula

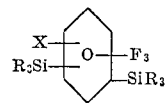

in which

X is a hydrogen atom, halogen atom or a perfluoroalkyl radical of from 1 to 10 carbon atoms; and R is a halogen atom, lower alkyl radical, an alkoxy radical, a —$CH_2CH_2R_f$ radical in which $R_f$ is a perfluoroalkyl radical of from 1 to 10 carbon atoms, the hydroxyl group or a hydrogen atom.

2. A compound in accordance with claim 1 consisting of 1,3-bis(3,3,3-trifluoropropylmethylhydroxysilyl) tetrafluorobenzene.

3. A compound in accordance with claim 1 consisting of 1,3-bis(dimethylhydroxysilyl) tetrafluorobenzene.

4. A compound in accordance with claim 1 consisting of 1,3-bis(di-3,3,3-trifluoropropylhydroxysilyl) tetrafluorobenzene.

5. A polymer consisting essentially of units of the formula

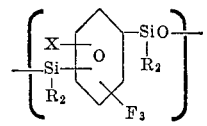

in which

X is a hydrogen atom, halogen atom or a perfluoroalkyl radical of from 1 to 10 carbon atoms; and R is a halogen atom, lower alkyl radical, an alkoxy radical, a —$CH_2CH_2R_f$ where $R_f$ is a perfluoroalkyl radical from 1 to 10 carbon atoms, the hydroxyl group or a hydrogen atom.

6. A polymer in accordance with claim 5 consisting essentially of units of the formula

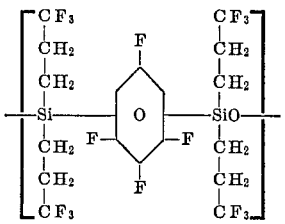

7. A polymer in accordance with claim 5 consisting essentially of units of the formula

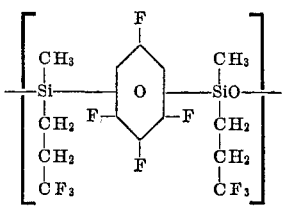

8. A polymer in accordance with claim 5 consisting essentially of units of the formula

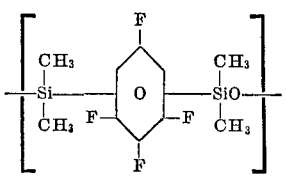

9. A copolymer containing at least one unit of the formula

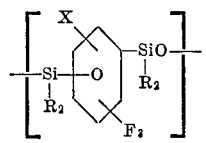

in which

X is a hydrogen atom, halogen atom or a perfluoroalkyl radical of from 1 to 10 carbon atoms; and R is a halogen atom, lower alkyl radical, an alkoxy radical, a —$CH_2CH_2R_f$ where $R_f$ is a perfluoroalkyl radical of from 1 to 10 carbon atoms, the hydroxyl group or a hydrogen atom; and the remaining units being of the formula

in which

Z is the hydrogen atom, the hydroxy group, a hydrolyzable radical, or an organic radical attached to the Si atom through an Si—C bond; and $a$ has a value of from 0 to 3 inclusive.

10. A method of preparing bis-silyl compounds of the general formula

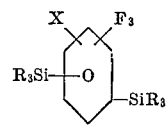

in which

X is a hydrogen atom, halogen atom or a perfluoroalkyl radical of from 1 to 10 carbon atoms; and R is a halogen atom, lower alkyl radical, an alkoxy radical, a —$CH_2CH_2R_f$ radical in which $R_f$ is a perfluoroalkyl radical of from 1 to 10 carbon atoms, the hydroxyl group or a hydrogen atom.

comprising the steps of:

forming a mixture of (a) a silane of the general formula ClSiR$_3$, where R is as defined above, and (b) a halofluoroaromatic of the formula

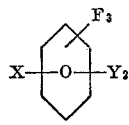

where X is as defined above and Y is a chlorine, bromine or iodine atom, and (c) magnesium in (d) tetrahydrofuran;

heating the mixture to effect reaction between the silane, the halofluoroaromatic and magnesium to produce the bis-silyl compound; and recovering the bis-silyl compound from the reaction mixture.

11. The method of claim 10 wherein the halofluoroaromatic compound is dichlorotetrafluorobenzene.

References Cited

UNITED STATES PATENTS

| | | | |
|---|---|---|---|
| 2,499,561 | 3/1950 | Barry | 260—448.2D |
| 2,628,242 | 2/1953 | Clark | 260—448.2D |
| 2,709,692 | 5/1955 | Gainer | 260—46.5P |
| 2,739,638 | 3/1956 | Lewis et al. | 260—448.2DX |
| 3,334,120 | 8/1967 | Holbrook et al. | 260—448.2D |

TOBIAS E. LEVOW, Primary Examiner

P. F. SHAVER, Assistant Examiner

U.S. Cl. X.R.

260—37, 46.5P, 448.2R; 252—49.6